United States Patent
Qi et al.

(10) Patent No.: US 9,791,628 B2
(45) Date of Patent: Oct. 17, 2017

(54) OPTICAL BRANCHING ASSEMBLY, PASSIVE OPTICAL NETWORK, AND OPTICAL TRANSMISSION METHOD

(71) Applicant: Huawei Technologies Co., Ltd., Shenzhen (CN)

(72) Inventors: Biao Qi, Wuhan (CN); Jun Zhao, Shenzhen (CN); Xishe Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/943,902

(22) Filed: Nov. 17, 2015

(65) Prior Publication Data

US 2016/0070065 A1    Mar. 10, 2016

Related U.S. Application Data

(63) Continuation of application No. PCT/CN2014/077576, filed on May 15, 2014.

(30) Foreign Application Priority Data

May 24, 2013    (CN) .......................... 2013 1 0198671

(51) Int. Cl.
*G02B 6/28* (2006.01)
*G02B 6/125* (2006.01)
(Continued)

(52) U.S. Cl.
CPC ........... *G02B 6/2804* (2013.01); *G02B 6/125* (2013.01); *H04B 10/27* (2013.01); *H04B 10/564* (2013.01); *H04Q 11/0001* (2013.01)

(58) Field of Classification Search
CPC ...... G02B 6/2804; G02B 6/125; H04B 10/27; H04B 10/564; H04Q 11/0001
(Continued)

(56) References Cited

U.S. PATENT DOCUMENTS 7,283,710 B2    10/2007  Sano et al.
7,773,851 B2     8/2010  Castonguay et al.
(Continued)

FOREIGN PATENT DOCUMENTS

CN    1576921 A    2/2005
CN    102790644 A    11/2012
(Continued)

*Primary Examiner* — Dalzid Singh
(74) *Attorney, Agent, or Firm* — Oblon, McClelland, Maier & Neustadt, L.L.P.

(57) ABSTRACT

Embodiments of the present invention provide an optical branching assembly, a passive optical network, and an optical transmission method, which relate to the field of communications and are used to implement a functional diversity of the optical branching assembly. The optical branching assembly includes: a substrate and an optical power distribution area disposed on a surface of the substrate, where the optical power distribution area is coupled to a first optical waveguide, multiple second optical waveguides, and at least one third optical waveguide, and is used to distribute optical power of an optical signal, transmitted through the first optical waveguide, to each of the second optical waveguides and the at least one third optical waveguide; and the third optical waveguide is coupled to the first optical waveguide, where a reflective material is disposed on the third optical waveguide.

14 Claims, 4 Drawing Sheets

(51) Int. Cl.
*H04B 10/27* (2013.01)
*H04B 10/564* (2013.01)
*H04Q 11/00* (2006.01)

(58) Field of Classification Search
USPC .......................................................... 398/58
See application file for complete search history.

(56) References Cited

U.S. PATENT DOCUMENTS

| | | | | |
|---|---|---|---|---|
| 8,917,992 | B1* | 12/2014 | Lam | H04J 14/0239 370/352 |
| 2005/0025427 | A1 | 2/2005 | Dougherty et al. | |
| 2006/0083515 | A1* | 4/2006 | Hann | H04J 14/02 398/87 |
| 2006/0110161 | A1* | 5/2006 | Cho | H04B 10/071 398/72 |
| 2008/0031624 | A1* | 2/2008 | Smith | H04B 10/071 398/71 |
| 2008/0298748 | A1 | 12/2008 | Cox et al. | |
| 2009/0052842 | A1* | 2/2009 | Draxler | B32B 37/12 385/46 |
| 2009/0323050 | A1 | 12/2009 | Tekawa | |
| 2011/0268438 | A1* | 11/2011 | Daems | H04B 10/071 398/16 |
| 2015/0270895 | A1* | 9/2015 | Fink | H04B 10/071 398/16 |

FOREIGN PATENT DOCUMENTS

| | | |
|---|---|---|
| CN | 103227677 A | 7/2013 |
| EP | 2264420 A1 | 12/2010 |
| JP | H05164924 A | 6/1993 |
| JP | H0787017 A | 3/1995 |
| JP | H11027211 A | 1/1999 |
| JP | 3110637 U | 5/2005 |
| JP | 2006203823 A | 8/2006 |
| JP | 2010008143 A | 1/2010 |
| KR | 20080093756 A | 10/2008 |

\* cited by examiner

OPTICAL BRANCHING ASSEMBLY, PASSIVE OPTICAL NETWORK, AND OPTICAL TRANSMISSION METHOD

This application is a continuation of International Application No. PCT/CN2014/077576, filed on May 15, 2014, which claims priority to Chinese Patent Application No. 201310198671.9, filed on May 24, 2013, both of which are incorporated herein by reference in their entireties.

TECHNICAL FIELD

The present invention relates to the field of communications, and in particular, to an optical branching assembly, a passive optical network, and an optical transmission method.

BACKGROUND

In the prior art, a passive optical network includes: an optical line terminal (OLT), an optical splitter, and multiple optical network units (ONU). The optical splitter is connected to the optical line terminal by using a feeder fiber, and the optical splitter is connected to the multiple optical network units by using drop fibers.

The optical splitter is an important passive component in an ODN (Optical Distribution Network) link. In the passive optical network, the optical splitter may receive an optical signal transmitted by the optical line terminal through the feeder fiber and transmit the optical signal to each of the optical network units through the drop fibers, or may receive an optical signal transmitted by each of the optical network units through the drop fibers and transmit the optical signal to the optical line terminal through the feeder fiber.

In a passive optical network, because a function of an optical splitter is completing optical signal transmission between an optical line terminal and an optical network unit that are in the passive optical network, the function of the optical splitter is implemented in a relatively single manner.

SUMMARY

Embodiments of the present invention provide an optical branching assembly, a passive optical network, and an optical transmission method, which are used to implement a functional diversity of the optical branching assembly.

To achieve the foregoing objective, the embodiments of the present invention use the following technical solutions:

According to a first aspect, an embodiment of the present invention provides an optical branching assembly, including: a substrate and an optical power distribution area disposed on a surface of the substrate, where the optical power distribution area is coupled to a first optical waveguide, multiple second optical waveguides, and at least one third optical waveguide, and is used to distribute optical power of an optical signal, transmitted through the first optical waveguide, to each of the second optical waveguides and the at least one third optical waveguide; and the third optical waveguide is coupled to the first optical waveguide, where a reflective material is disposed on the third optical waveguide, and after the reflective material reflects the optical signal that is from the optical power distribution area, the optical signal is transmitted to the first optical waveguide through the third optical waveguide.

In a first possible implementation manner of the first aspect, optical power of the optical signal transmitted through any one of the second optical waveguides is different from optical power of the optical signal transmitted through the third optical waveguide.

With reference to the first aspect or the first possible implementation manner of the first aspect, in a second possible implementation manner of the first aspect, the third optical waveguide is disposed on the surface of the substrate, and the third optical waveguide is coupled to the first optical waveguide.

With reference to the first aspect or the first or second possible implementation manner of the first aspect, in a third possible implementation manner of the first aspect, the optical power distribution area includes a Y-shaped optical power branching waveguide element or an arrayed waveguide grating.

According to a second aspect, an embodiment of the present invention provides a passive optical network, where the passive optical network includes: an optical line terminal, an optical distribution network, and at least one optical network unit, the optical line terminal is connected to the optical distribution network by using a feeder fiber, and the optical distribution network is connected to the at least one optical network unit by using a drop fiber, where the optical distribution network includes the optical branching assembly according to the foregoing embodiment.

In a first possible implementation manner of the second aspect, the passive optical network further includes a detection device, where the detection device is disposed on one side of a connection between the optical distribution network and the optical line terminal, and the detection device is configured to receive an optical signal reflected by the optical branching assembly and detect the reflected optical signal.

According to a third aspect, an embodiment of the present invention provides an optical branching assembly, where the optical branching assembly includes a processor, and signal processing actions executed by the processor include: receiving a first optical signal transmitted through a feeder fiber; dividing the first optical signal transmitted through the feeder fiber into multiple second optical signals and at least one third optical signal; reflecting the third optical signal to the feeder fiber; and transmitting each of the second optical signals to each user terminal.

In a first possible implementation manner of the third aspect, optical power of the second optical signal is different from optical power of the third optical signal.

With reference to the third aspect or the first possible implementation manner of the third aspect, in a second possible implementation manner of the third aspect, the optical power of the third optical signal is lower than optical power of any one of the second optical signals.

According to a fourth aspect, an embodiment of the present invention provides an optical transmission method, including: receiving a first optical signal transmitted through a feeder fiber; dividing the first optical signal transmitted through the feeder fiber into multiple second optical signals and at least one third optical signal; reflecting the third optical signal to the feeder fiber; and transmitting each of the second optical signals to each user terminal.

In a first possible implementation manner of the fourth aspect, optical power of the second optical signal is different from optical power of the third optical signal.

With reference to the fourth aspect or the first possible implementation manner of the fourth aspect, in a second possible implementation manner of the fourth aspect, the optical power of the third optical signal is lower than optical power of any one of the second optical signals.

The embodiments of the present invention provide an optical branching assembly, a passive optical network, and an optical transmission method, where the optical branching assembly includes: a substrate, an optical power distribution area, a first optical waveguide, multiple second optical waveguides, and at least one third optical waveguide, where a reflective material is disposed on the third optical waveguide. In this way, after an optical signal is transmitted to the optical power distribution area through the first optical waveguide, the optical power distribution area distributes part of optical power of the optical signal to the at least one third optical waveguide, so that the optical signal is transmitted to the first optical waveguide through the at least one third optical waveguide by using the reflective material. In addition, the optical signal is transmitted to ribbon fibers through the second optical waveguides, and is further transmitted to an optical network unit, so as to ensure normal transmission of a service. The optical branching assembly has a compact structure, which not only can transmit an optical signal, but also can reflect part of the optical signal, so that a system can perform corresponding processing on the reflected optical signal, thereby implementing a functional diversity of the optical branching assembly.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
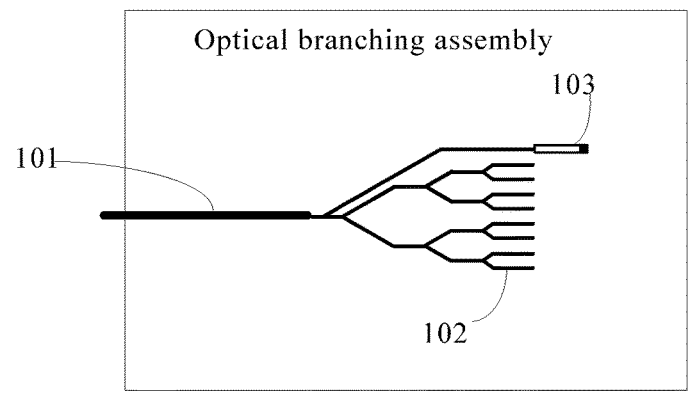
FIG. 1 is a schematic structural diagram of an optical branching assembly according to an embodiment of the present invention.

An embodiment of the present invention provides an optical branching assembly, as shown in FIG. 1, including: a substrate, an optical power distribution area disposed on a surface of the substrate, a first optical waveguide 101, multiple optical waveguides 102, and at least one third optical waveguide 103.

The optical power distribution area is coupled to the first optical waveguide 101, the multiple second optical waveguides 102, and the at least one third optical waveguide 103, and is used to distribute optical power of an optical signal, transmitted through the first optical waveguide 101, to each of the second optical waveguides 102 and the at least one third optical waveguide 103.

The third optical waveguide 103 is coupled to the first optical waveguide 101, where a reflective material is disposed on the third optical waveguide 103, and after the reflective material reflects the optical signal that is from the optical power distribution area, the optical signal is transmitted to the first optical waveguide 101 through the third optical waveguide 103.

In this way, by using an reflective material disposed on the third optical waveguide of the optical branching assembly, the optical signal that is from the optical power distribution area is reflected and then is transmitted to the first optical waveguide through the third optical waveguide. Therefore, the optical signal may be transmitted to a detection device at a central office end through the first optical waveguide, to implement monitoring on an optical link without affecting normal link communication, thereby improving the monitoring efficiency.

Further, optical power of the optical signal transmitted through any one of the second optical waveguides is different from optical power of the optical signal transmitted through the third optical waveguide.

Preferably, the optical power of the optical signal transmitted through the third optical waveguide is lower than optical power of the optical signals transmitted through any one of the second optical waveguides.

Specifically, the optical power distribution area may distribute, to the at least one third optical waveguide 103, part of the optical power of the optical signal transmitted through the first optical waveguide 101, and distribute the optical signal with the remaining power to the multiple second optical waveguides 102 on average.

Exemplarily, the optical power distribution area distributes, to the at least one third optical waveguide 103, the optical signal that is with 5% of the optical power and from the optical signal transmitted through the first optical waveguide 101, and distributes the optical signal with the remaining 95% of the optical power to the multiple second optical waveguides 102 on average. For example, there are eight second optical waveguides 102 in the optical branching assembly, and the optical signal with 95% of the optical power is distributed to the eight second optical waveguides 102 on average. In this way, the at least one third optical waveguide 103 reflects the received optical signal with 5% of the optical power to the first optical waveguide 101 by using the reflective material, so that the 5% optical signal is transmitted to the detection device at the central office end through the first optical waveguide 101. The received 95% optical signal is transmitted to a service receive end through the second optical waveguides 102.

It should be noted that the optical power distribution area may distribute the optical signal with 5% to 20% of the optical power to the third optical waveguide for performing reflection, and may also distribute optical signal with another proportion of the optical power to the third optical waveguide for performing reflection. As long as a reflected optical signal can be detected by the detection device disposed at the central office end, and further, the detection device can detect an optical fiber according to the reflected optical signal, the proportion can be set arbitrarily, which is not limited in the present invention.

It should be noted that if there is one third optical waveguide in the optical branching assembly, the optical power distribution area distributes part of the optical power of the optical signal to the third optical waveguide; if there are at least two third optical waveguides, the optical power distribution area may distribute the part of the optical power of the optical signal with to the at least two third optical waveguides on average, where the optical signal distributed to each of the third optical waveguides can be detected by the detection device disposed at the central office end.

It should be noted that in the optical branching assembly the number of second optical waveguides may be 8, may be 16 or 32, or may be another number, which is not limited in the present invention.

Further, the first optical waveguide 101, the second optical waveguides 102, and the third optical waveguide 103 may be single-mode fibers.

Further, the third optical waveguide 103, on which the reflective material is disposed on, may be a fiber Bragg grating (FBG), or may be made by coating a reflective film on an end surface of an end of an optical fiber, and the figure shows one situation.

It should be noted that the reflective film may be a dielectric film, may be a metal film, or may be another reflective film, which is not limited in the present invention.

It should be noted that in order to implement a reflection function of the third optical waveguide, in addition to disposing a reflective material on the third optical waveguide, further, an end surface of the third optical waveguide may be ground and polished to make the end surface have the reflection function. In this embodiment of the present invention, any method for reflecting an optical signal to the first optical waveguide by the third optical waveguide having a reflection function shall fall within the protection scope of the present invention, and the present invention imposes no limitation on the method for how to implement a reflection function by the third optical waveguide.

It should be noted that the reflective material disposed on the third optical waveguide 103 may be a reflective material that performs total reflection on an optical signal, or may be a reflective material that performs partial reflection on an optical signal, which is not limited in the present invention.

Further, the third optical waveguide 103 is disposed on the surface of the substrate, and the third optical waveguide 103 is coupled to the first optical waveguide 101.

Specifically, the third optical waveguide 103 is disposed on the surface of the substrate, which helps fasten the third optical waveguide 103.

It should be noted that the third optical waveguide may further be coupled to the first optical waveguide in another manner, which is not limited in the present invention.

Further, the second optical waveguides 102 are coupled to the first optical waveguide 101, and the optical signal transmitted through the first optical waveguide is transmitted through the second optical waveguides 102.

Further, the second optical waveguides 102 may also be disposed on the surface of the substrate, and the second optical waveguides 102 may be coupled to the first optical waveguide 101.

It should be noted that the second optical waveguides may further be coupled to the first optical waveguide in another manner, which is not limited in the present invention.

Further, the optical power distribution area includes a Y-shaped optical power branching waveguide element or an arrayed waveguide grating, thereby distributing the optical signal, transmitted through the first optical waveguide 101, to the multiple second optical waveguides 102 and the at least one third optical waveguide 103.

It should be noted that the optical power distribution area may further include an optical power branching waveguide element or an arrayed waveguide grating of another type, which is not limited in the present invention.

Further, the substrate may be a silica substrate, may be a silicon substrate, or may be another substrate, which is not limited in the present invention.

Further, the optical branching assembly in this embodiment of the present invention may be a passive optical component, for example, an optical splitter.

This embodiment of the present invention provides an optical branching assembly, including: a substrate, an optical power distribution area, a first optical waveguide, multiple second optical waveguides, and at least one third optical waveguide, where a reflective material is disposed on the third optical waveguide. In this way, after an optical signal is transmitted to the optical power distribution area through the first optical waveguide, the optical power distribution area distributes part of optical power of the optical signal to the at least one third optical waveguide, so that the optical signal is transmitted to the first optical waveguide through the at least one third optical waveguide by using the reflective material. In addition, the optical signal is transmitted to ribbon fibers through the second optical waveguides, and is further transmitted to an optical network unit, so as to ensure normal transmission of a service. The optical branching assembly has a compact structure, which not only can transmit an optical signal, but also can reflect part of the optical signal, so that a system can perform corresponding processing on the reflected optical signal, thereby implementing a functional diversity of the optical branching assembly.

Figure 2:
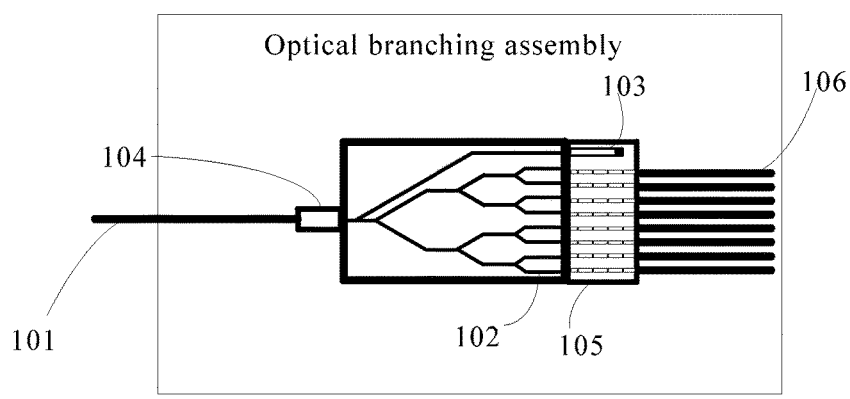
FIG. 2 is a schematic structural diagram of another optical branching assembly according to an embodiment of the present invention.

As shown in FIG. 2, the optical branching assembly further includes: a first optical fiber array 104, a second optical fiber array 105, and ribbon fibers 106.

The first optical fiber array 104 is configured to align the first optical waveguide 101 with the multiple second optical waveguides 102 and the at least one third optical waveguide 103.

The second optical fiber array 105 is configured to align the second optical waveguides 102 with the ribbon fibers 106.

The ribbon fibers 106 are configured to transmit the optical signal transmitted through the second optical waveguides.

Further, the number of ribbon fibers 106 and the number of second optical waveguides 102 are the same, namely, each of the second optical waveguides 102 has one ribbon fiber 106 corresponding to the second optical waveguide 102.

Figure 3:
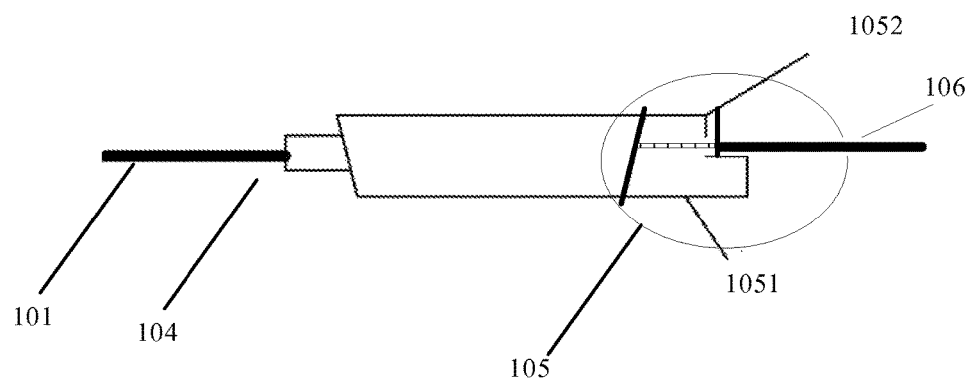
FIG. 3 is a schematic structural diagram of another optical branching assembly according to an embodiment of the present invention.

Further, as shown in FIG. 3, the second optical fiber array 105 further includes: a V-shaped groove 1051 and a cover 1052.

Still further, the third optical waveguide 103 is located between the V-shaped groove 1051 and the cover 1052.

Alternatively, the third optical waveguide 103 is located outside the V-shaped groove 1051 and the cover 1052.

This embodiment of the present invention provides an optical branching assembly, where after an optical signal is transmitted to an optical power distribution area through a first optical waveguide, the optical power distribution area distributes part of optical power of the optical signal to at least one third optical waveguide, so that the optical signal is transmitted to the first optical waveguide through the at least one third optical waveguide by using a reflective material. In addition, the optical signal is transmitted to ribbon fibers through second optical waveguides, and is further transmitted to an optical network unit, so as to ensure normal transmission of a service. The optical branching assembly has a compact structure, which not only can transmit an optical signal, but also can reflect part of the optical signal, so that a system can perform corresponding processing on the reflected optical signal, thereby implementing a functional diversity of the optical branching assembly.

Figure 4:
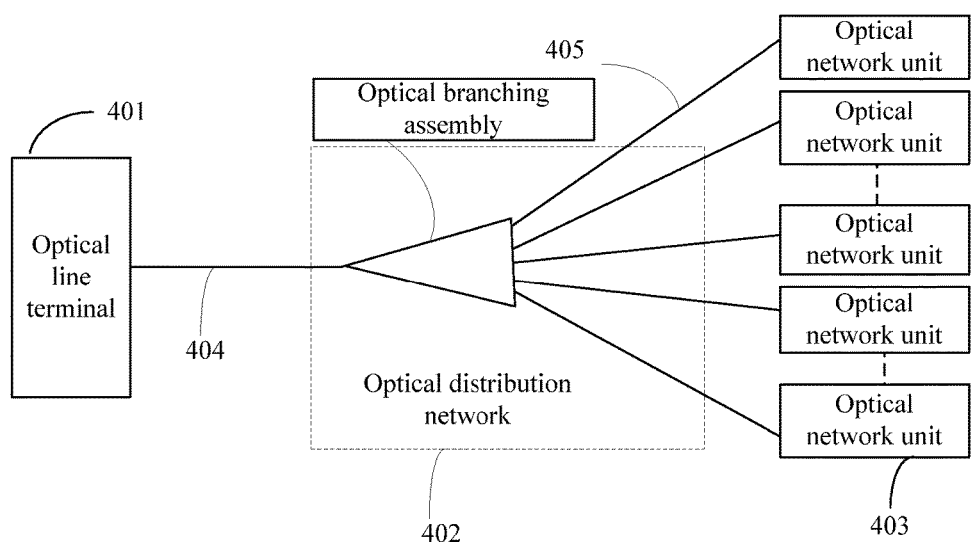
FIG. 4 is a schematic structural diagram of a passive optical network according to an embodiment of the present invention.

As shown in FIG. 4, FIG. 4 is a schematic structural diagram of a passive optical network to which an optical power detection solution may be applicable according to an embodiment of the present invention. The passive optical network includes: an optical line terminal 401, an optical distribution network 402, and at least one optical network unit 403.

The optical line terminal 401 is connected to the optical distribution network 402 by using a feeder fiber 404, and the optical distribution network 402 is connected to the at least one optical network unit 403 by using drop fibers 405, where the optical distribution network 402 includes an optical branching assembly, and the optical branching assembly is the optical branching assembly described in the foregoing embodiment.

Specifically, the optical line terminal 401 (OLT) is configured to connect to a terminal device on a fiber trunk.

The optical network unit 403 (ONU) is a terminal device accessed by an optical fiber, and is configured to provide a user-side interface.

The feeder fiber 404 is configured to connect the optical line terminal 401 and the optical distribution network 402.

Further, the optical line terminal 401 is connected to the multiple optical network units 403 by using the optical distribution network 402 in a point-to-multipoint form, where a direction from the optical line terminal 401 to the optical network unit 403 is defined as a downlink direction, and a direction from the optical network unit 403 to the optical line terminal 401 is an uplink direction.

It should be noted that the passive optical network may be a communications network that does not require any active components to implement data distribution between the optical line terminal 401 and the optical network unit 403.

Further, the optical branching assembly is a passive optical component, for example, an optical splitter.

Further, the optical branching assembly includes a substrate and an optical power distribution area disposed on a surface of the substrate. The optical power distribution area is coupled to a first optical waveguide, multiple second optical waveguides, and at least one third optical waveguide, and is used to distribute optical power of an optical signal, transmitted through the first optical waveguide, to each of the second optical waveguides and the at least one third optical waveguide; and the third optical waveguide is coupled to the first optical waveguide.

A reflective material is disposed on the third optical waveguide, and after the reflective material reflects the optical signal that is from the optical power distribution area, the optical signal is transmitted to the first optical waveguide through the third optical waveguide.

Further, optical power of the optical signal transmitted through any one of the second optical waveguides is different from optical power of the optical signal transmitted through the third optical waveguide.

Further, the third optical waveguide is disposed on the surface of the substrate, and the third optical waveguide is coupled to the first optical waveguide.

Further, the optical power distribution area includes a Y-shaped optical power branching waveguide element or an arrayed waveguide grating.

Further, the optical branching assembly further includes: a first optical fiber array, a second optical fiber array, and ribbon fibers.

The first optical fiber array is configured to align the first optical waveguide with the multiple second optical waveguides and the at least one third optical waveguide; the second optical fiber array is configured to align the second optical waveguides with the ribbon fibers; and the ribbon fibers are configured to transmit the optical signal transmitted through the second optical waveguides.

Further, that the optical distribution network 402 is connected to the at least one optical network unit 403 by using drop fibers 405 includes:

the optical distribution network 402 is connected to the drop fibers 405 by using the ribbon fibers of the optical branching assembly, and is connected to the at least one optical network unit 403 by using the drop fibers 405.

It should be noted that the optical distribution network 402 is connected to the drop fibers 405 by using the fibers in the ribbon fiber of the optical branching assembly, where fibers in the ribbon fiber in the optical branching assembly are connected to the drop fibers 405 separately, namely, the fibers in the ribbon fiber of the optical branching assembly are in a one-to-one correspondence with the drop fibers 405.

It should be noted that an optical distribution network may include multiple optical branching assemblies, or may include one optical branching assembly, which is not limited in the present invention.

In this way, in a passive optical network, part of an optical signal may be reflected to a feeder fiber by using an optical branching assembly in an optical distribution network, and therefore, related processing may be performed by using the reflected optical signal, thereby implementing a functional diversity of the optical branching assembly, and increasing a utilization rate of the optical branching assembly.

Figure 5:
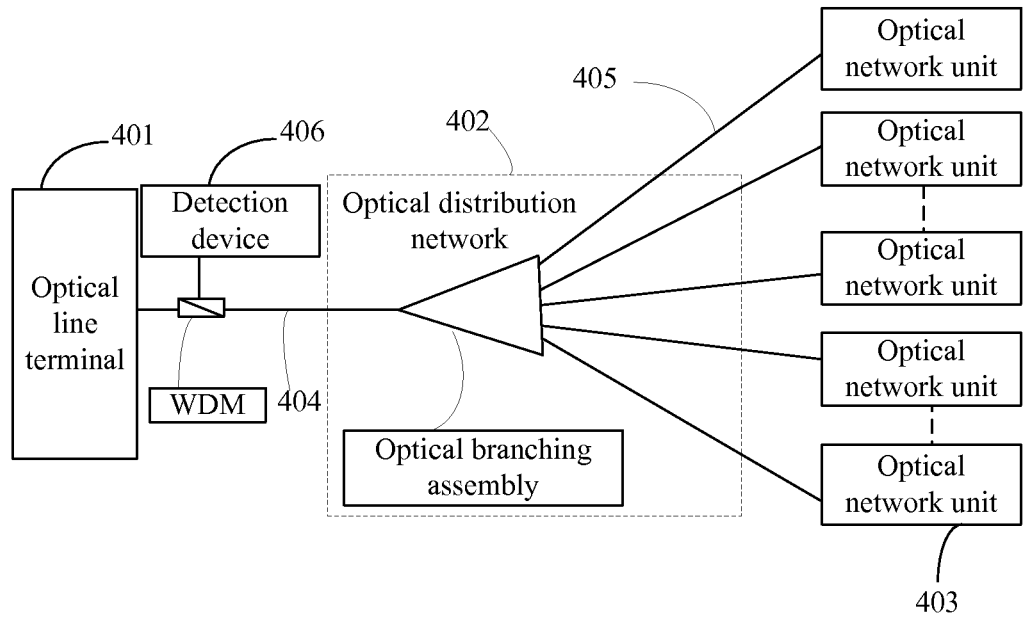
FIG. 5 is a schematic structural diagram of another passive optical network according to an embodiment of the present invention.

Further, as shown in FIG. 5, the passive optical network further includes: a detection device 406.

The detection device 406 is disposed on one side of a connection between the optical distribution network 402 and the optical line terminal 401; and the detection device is configured to receive the optical signal reflected by the optical branching assembly and detect the reflected optical signal.

It should be noted that the detection device is disposed on one side of the connection between the optical distribution network and the optical line terminal refers to that the detection device may be disposed between the optical line terminal and the optical distribution network, or the detection device may be disposed at a location of the optical line terminal, and the figure shows only one situation.

Further, the detection device 406 is further configured to learn, according to a detection result, whether an optical link is abnormal.

It should be noted that in this embodiment of the present invention, in the passive optical network, the detection device may be connected to the passive optical network by using a WDM (wavelength division multiplexer), and as shown in FIG. 5, the detection device may be an optical time domain reflectometer (OTDR).

In a passive optical network, part of an optical signal may be reflected to a feeder fiber by using an optical branching assembly in an optical distribution network, and therefore, the part of the optical signal may be transmitted to a detection device through the feeder fiber, so that the detection device receives the optical signal, and may further perform related monitoring. In this way, because power of the optical signal reflected to the feeder fiber is relatively low, and normal service communication performed by the feeder fiber is not affected; therefore, monitoring on an optical link before the optical branching assembly may be implemented, and further, when the optical link is abnormal, the detection device may find it out through monitoring, making the passive optical network have a compact structure. Further, in this embodiment of the present invention, detection performed on the optical signal by the detection device does not occupy service port resources in an optical network unit, and therefore, monitoring costs of the passive optical network can be reduced, and the monitoring efficiency can be improved.

This embodiment of the present invention provides a passive optical network, where an optical line terminal transmits an optical signal to an optical distribution network through a feeder fiber, and an optical branching assembly in the optical distribution network reflects part of optical power of the optical signal to the feeder fiber by using a reflective material disposed on a third optical waveguide, so that the optical signal is transmitted to a detection device at a central office end through the feeder fiber. The optical branching assembly in the optical distribution network transmits the optical signal with the remaining power to ribbon fibers through second optical waveguides, and the optical signal is further transmitted to drop fibers through the ribbon fibers, and is transmitted to an optical network unit through the drop fibers. In this way, the optical branching assembly in the optical distribution network distributes the part of the optical power of the optical signal to at least one third optical waveguide, so that the optical signal is transmitted to the feeder fiber through the at least one third optical waveguide by using the reflective material. In addition, the optical signal is transmitted to the ribbon fibers through the second optical waveguides, and is further transmitted to the optical network unit, so as to ensure normal transmission of a service. The optical branching assembly has a compact structure, which not only can transmit an optical signal, but also can reflect part of the optical signal, so that a system can perform corresponding processing on the reflected optical signal, thereby implementing a functional diversity of the optical branching assembly.

Figure 6:
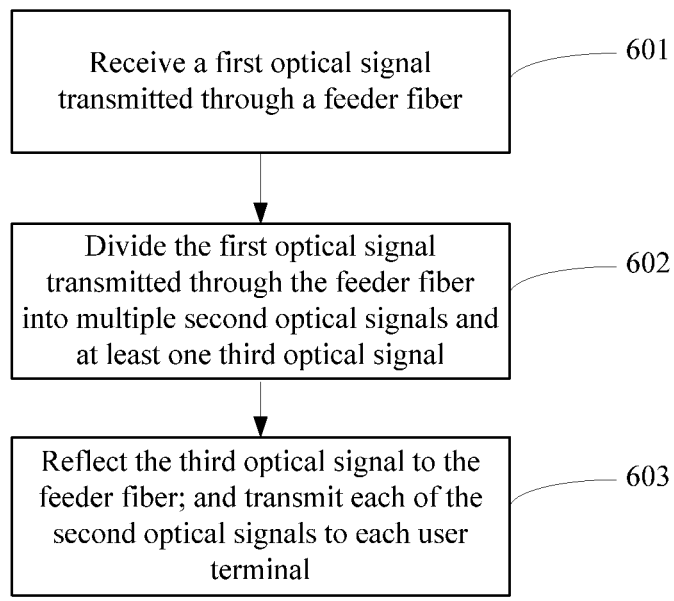
FIG. 6 is a schematic diagram of steps executed by a processor of an optical branching assembly according to an embodiment of the present invention.

An embodiment of the present invention provides an optical branching assembly, where the optical branching assembly includes a processor, and signal processing actions executed by the processor, as shown in FIG. 6, includes:

601: Receive a first optical signal transmitted through a feeder fiber.

602: Divide the first optical signal transmitted through the feeder fiber into multiple second optical signals and at least one third optical signal.

Optical power of the second optical signal is different from optical power of the third optical signal.

Further, the optical power of the third optical signal is lower than optical power of any one of the second optical signals.

Specifically, after receiving the first optical signal from the feeder fiber, the processor divides the first optical signal into the at least one third optical signal and the multiple second optical signals, where the optical power of each of the second optical signals is equal.

Exemplarily, the processor determines that an optical signal corresponding to 5% of the optical power of the first optical signal is the at least one third optical signal, and determines that the first optical signals with the remaining 95% of the optical power are the multiple second optical signals.

It should be noted that the processor may distribute the optical signal with 5% to 20% of the optical power as the at least one third optical signal for performing reflection, and may also distribute the optical signal with another proportion of the optical power as the at least one third optical signal for performing reflection. As long as a reflected optical signal can be detected by a detection device disposed at a central office end, and further, the detection device can detect an optical fiber according to the reflected optical signal, the proportion can be set arbitrarily, which is not limited in the present invention.

603: Reflect the third optical signal to the feeder fiber; and transmit each of the second optical signals to each user terminal.

Specifically, after dividing the first optical signal into the at least one third optical signal and the multiple second optical signals, the processor reflects the at least one third optical signal to the feeder fiber, so that the third optical signal is transmitted to the detection device at the central office end through the feeder fiber, and therefore, the detection device can detect the optical fiber according to the reflected third optical signal.

In this way, the third optical signal is reflected to the feeder fiber, and the third optical signal may be transmitted to the detection device at the central office end through the feeder fiber, to implement monitoring on an optical link without affecting normal link communication, thereby improving the monitoring efficiency.

Further, the optical branching assembly in this embodiment of the present invention may be a passive optical component, for example, an optical splitter.

This embodiment of the present invention provides an optical branching assembly, which divides a received first optical signal transmitted through a feeder fiber into at least one third optical signal and multiple second optical signals, reflects the at least one third optical signal to the feeder fiber, and transmits each of the second optical signals to each user terminal. In this way, a processor divides the first optical signal into the third optical signal, and reflects the third optical signal to the feeder fiber. In addition, the second optical signals are transmitted to each user terminal. The optical branching assembly has a compact structure, which not only can transmit an optical signal, but also can reflect part of the optical signal, so that a system can perform corresponding processing on the reflected optical signal, thereby implementing a functional diversity of the optical branching assembly.

Figure 7:
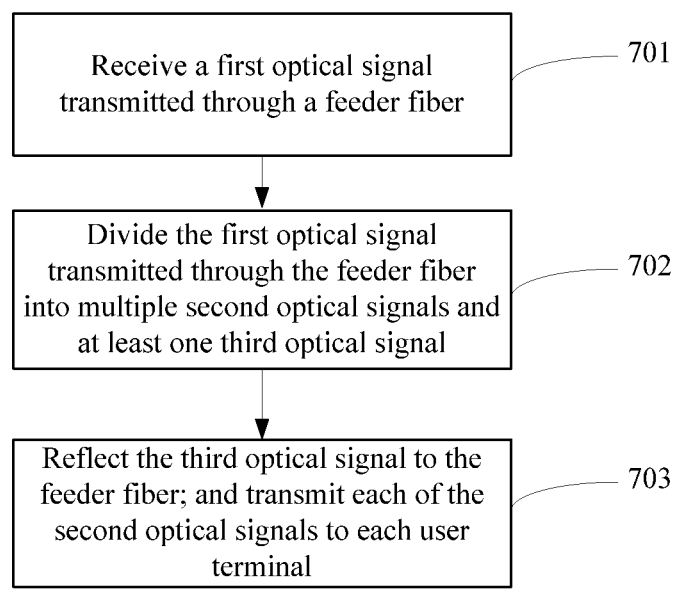
FIG. 7 is a schematic flowchart of an optical transmission method according to an embodiment of the present invention.

An embodiment of the present invention provides an optical transmission method, as shown in FIG. 7, including:

701: Receive a first optical signal transmitted through a feeder fiber.

702: Divide the first optical signal transmitted through the feeder fiber into multiple second optical signals and at least one third optical signal.

Optical power of the second optical signal is different from optical power of the third optical signal.

Further, the optical power of the third optical signal is lower than optical power of any one of the second optical signals.

Specifically, after receiving the first optical signal from the feeder fiber, an optical branching assembly divides the first optical signal into the at least one third optical signal and the multiple second optical signals, where the power of each of the second optical signals is equal.

Exemplarily, the optical branching assembly determines that an optical signal corresponding to 5% of the optical power of the first optical signal is the at least one third optical signal, and determines that the first optical signals with the remaining 95% of the optical power are the multiple second optical signals.

It should be noted that the optical branching assembly may distribute the optical signal with 5% to 20% of the optical power as the at least one third optical signal for performing reflection, and may also distribute the optical signal with another proportion of the optical power as the at least one third optical signal for performing reflection. As long as a reflected optical signal can be detected by a detection device disposed at a central office end, and further, the detection device can detect an optical fiber according to the reflected optical signal, the proportion can be set arbitrarily, which is not limited in the present invention.

703: Reflect the third optical signal to the feeder fiber; and transmit each of the second optical signals to each user terminal.

Specifically, after dividing the first optical signal into the at least one third optical signal and the multiple second optical signals, the optical branching assembly reflects the at least one third optical signal to the feeder fiber, so that the third optical signal is transmitted to the detection device at the central office end through the feeder fiber, and therefore, the detection device can detect the optical fiber according to the reflected third optical signal.

In this way, the third optical signal is reflected to the feeder fiber, and the third optical signal may be transmitted to the detection device at the central office end through the feeder fiber, to implement monitoring on an optical link without affecting normal link communication, thereby improving the monitoring efficiency.

This embodiment of the present invention provides an optical transmission method, where a received first optical signal transmitted through a feeder fiber is divided into at least one third optical signal and multiple second optical signals, the at least one third optical signal is reflected to the feeder fiber, and each of the second optical signals is transmitted to each user terminal. In this way, an optical branching assembly divides the first optical signal into the third optical signal, and reflects the third optical signal to the feeder fiber. In addition, the second optical signals are transmitted to each user terminal, so as to ensure normal transmission of a service. The optical branching assembly implementing the foregoing optical transmission method has a compact structure, which not only can transmit an optical signal, but also can reflect part of the optical signal, so that a system can perform corresponding processing on the reflected optical signal, thereby implementing a functional diversity of the optical branching assembly.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An optical branching assembly, comprising:
   a substrate having an optical power distribution area disposed on a surface of the substrate;
   wherein the optical power distribution area is coupled to a first optical waveguide, multiple second optical waveguides, and at least one third optical waveguide;
   wherein each of the second optical waveguides is coupled to a respective fiber of an optical fiber array that is disposed on the surface of the substrate, and the third optical waveguide is disposed alongside and parallel to each of the respective fibers of the optical fiber array;
   wherein the optical power distribution area is configured to distribute, to each of the second optical waveguides and to the at least one third optical waveguide, optical power of an optical signal that is transmitted through the first optical waveguide;
   wherein the at least one third optical waveguide is coupled to the first optical waveguide;
   wherein a reflective material is disposed on the third optical waveguide such that, after the reflective material reflects the optical signal sent from the optical power distribution area, the optical signal is transmitted to the first optical waveguide through the third optical waveguide;
   wherein a first optical power of the optical signal is transmitted through the third optical waveguide, and a second optical power of the optical signal is transmitted through each one of the second optical waveguides; and
   wherein the first optical power is fixed and the second optical power is divided among a number of the second optical waveguides.

2. The optical branching assembly according to claim 1, wherein the second optical power of the optical signal transmitted through any one of the second optical waveguides is different from the first optical power of the optical signal transmitted through the third optical waveguide.

3. The optical branching assembly according to claim 1, wherein the third optical waveguide is disposed on the surface of the substrate, and wherein the third optical waveguide is coupled to the first optical waveguide.

4. The optical branching assembly according to claim 1, wherein the optical power distribution area comprises at least one of a Y-shaped optical power branching waveguide element or an arrayed waveguide grating.

5. The optical branching assembly according to claim 1, wherein the fibers of the optical fiber array and the third optical waveguide are disposed between a cover and grooves in the substrate.

6. The optical branching assembly according to claim 1, wherein the fibers of the optical fiber array are disposed between a cover and grooves in the substrate, and wherein the third optical waveguide is disposed outside of the cover and the grooves in the substrate.

7. A passive optical network, comprising:
   an optical line terminal;
   an optical distribution network comprising an optical branching assembly, wherein the optical line terminal is connected to the optical distribution network by using a feeder fiber; and
   at least one optical network unit, wherein the optical distribution network is connected to the at least one optical network unit by using drop fibers;
   wherein the optical branching assembly comprises:

a substrate having an optical power distribution area disposed on a surface of the substrate;

wherein the optical power distribution area is coupled to a first optical waveguide, multiple second optical waveguides, and at least one third optical waveguide;

wherein each of the second optical waveguides is coupled to a respective fiber of an optical fiber array that is disposed on the surface of the substrate, and the third optical waveguide is disposed alongside and parallel to each of the respective fibers of the optical fiber array;

wherein the optical power distribution area is configured to distribute, to each of the multiple second optical waveguides and the at least one third optical waveguide, optical power of an optical signal that is transmitted through the first optical waveguide;

wherein the third optical waveguide is coupled to the first optical waveguide;

wherein a reflective material is disposed on the third optical waveguide, such that, after the reflective material reflects the optical signal that is from the optical power distribution area, the optical signal is transmitted to the first optical waveguide through the third optical waveguide;

wherein a first optical power of the optical signal is transmitted through the third optical waveguide, and a second optical power of the optical signal is transmitted through each one of the second optical waveguides; and wherein the first optical power is fixed and the second optical power is divided among a number of the second optical waveguides.

8. The passive optical network according to claim 7, further comprising a detection device;

wherein the detection device is disposed on one side of a connection between the optical distribution network and the optical line terminal; and wherein the detection device is configured to receive an optical signal reflected by the optical branching assembly and detect the reflected optical signal.

9. The passive optical network according to claim 7, wherein the second optical power of the optical signal transmitted through any one of the multiple second optical waveguides is different from the first optical power of the optical signal transmitted through the at least one third optical waveguide.

10. The passive optical network according to claim 7, wherein the at least one third optical waveguide is disposed on the surface of the substrate; and wherein the at least one third optical waveguide is coupled to the first optical waveguide.

11. The passive optical network according to claim 7, wherein the optical power distribution area comprises at least one of a Y-shaped optical power branching waveguide element or an arrayed waveguide grating.

12. An optical transmission method, wherein the method comprises:

receiving, via a first optical waveguide, a first optical signal transmitted through a feeder fiber;

dividing the first optical signal that is transmitted through the feeder fiber into multiple second optical signals and at least one third optical signal, wherein the second optical signals are transmitted through multiple second optical waveguides, wherein the third optical signal is transmitted through a third optical waveguide, and wherein each of the second optical waveguides is coupled to a respective fiber of an optical fiber array that is disposed on a surface of a substrate, and the third optical waveguide is disposed alongside and parallel to each of the respective fibers of the optical fiber array;

reflecting the third optical signal to the feeder fiber; and transmitting each of the multiple second optical signals to a user terminal;

wherein the at least one third optical signal is transmitted at a first optical power, and each of the multiple second optical signals is transmitted at a second optical power; and wherein the first optical power is fixed and the second optical power is divided among a number of the multiple second optical signals.

13. The optical transmission method according to claim 12, wherein the second optical power of each of the multiple second optical signals is different from the first optical power of the third optical signal.

14. The optical transmission method according to claim 12, wherein the first optical power of the third optical signal is lower than the second optical power of any one of the multiple second optical signals.

* * * * *